Patented Oct. 2, 1951

2,569,695

UNITED STATES PATENT OFFICE 2,569,695

TREATMENT OF FIBROUS MATERIAL AND PRODUCT RESULTING THEREFROM

John W. Schick, Camden, and Howard D. Hartough, Pitman, N. J., assignors to Socony-Vacuum Oil Company, Incorporated, a corporation of New York No Drawing. Application September 4, 1947, Serial No. 772,214

7 Claims. (Cl. 117—76)

The present invention relates to the treatment of fibrous textile materials and, more particularly, to the treatment of fibrous textile materials to impart crush-resistance and water-repellence.

As used herein, the term "fibrous textile materials" includes wool, cotton, linen, silk, rayon, nylon, hemp, jute and various artificial fibers of organic material in the form of threads, skeins, or in woven form and also paper, sheeted cellulose, leather, fur and the like. Furthermore, as used herein, the term "phenol" includes monohydric and polyhydric monocyclic phenols, alkylmonohydric phenols, alkylpolyhydric phenols, and mono- and polyhydric polycyclic phenols.

In the co-pending application for United States Letters Patent Serial No. 670,031, filed May 15, 1946, in the names of Howard D. Hartough and Everett H. Murray the preparation of novel nitrogenous resins is described. This description teaches that such resins can be prepared by reacting (A) a compound having at least one nuclear hydrogen atom of pronounced reactivity, (B) an aldehyde and, (C) hydroxylamine hydrohalide and particularly (A) thiophene, (B) formaldehyde and (C) hydroxylamine hydrochloride in the ratio of about 0.5 to about 1 mole of A: about 0.5 to about 2 moles of B: about 0.5 to about 1 mole of C at temperatures of about 10° C. to the reflux temperature. Furthermore in the co-pending application for United States Letters Patent Serial No. 772,212, filed September 4, 1947, in the names of John W. Schick and Howard D. Hartough, now Patent No. 2,546,946, the preparation of modified phenol-formaldehyde resins is described. According to this description (A) a phenol devoid of reactive acidic and basic substituent and having at least one nuclear hydrogen atom of pronounced reactivity, (B) formaldehyde and (C) an ammonium halide are reacted in molal ratio of A:B:C=1: at least 3: more than 0.25 in the presence of an acid having a dissociation constant above $1 \times 10^{-5}$ but not greater than about $1.7 \times 10^{-2}$. In the co-pending application for United States Letters Patent Serial No. 636,511, filed December 21, 1945, now abandoned, in the names of Howard D. Hartough and Sigmund J. Lukasiewicz, the preparation of nitrogenous condensation products having as a characterizing group the thiophene residue, $C_4H_nS$ where $n$ equals zero to 3 is described. This method comprises condensing at temperatures of about 65° C. to the reflux temperature (A) a thiophene compound having at least one replaceable nuclear hydrogen atom selected from the group consisting of thiophene and thiophene having a stable electropositive nuclear substituent, (B) formaldehyde and (C) a nitrogenous compound selected from the group consisting of chlorides and bromides of ammonia, primary amines, secondary amines, primary diamines and urea, said thiophene compound, formaldehyde and nitrogenous compound being present in the reaction mixture in the molal ratio of 1 to 2:0.5 to 4:0.25 to 3. In the co-pending application for United States Letters Patent Serial No. 781,754, filed October 23, 1947, in the names of John W. Schick and Howard D. Hartough, the preparation of novel nitrogenous resins containing at least one 5-membered heterocyclic radical per polymer unit is described. The method therein described comprises reacting (A) a 5-membered heterocyclic compound having at least one nuclear hydrogen atom of pronounced reactivity, (B) formaldehyde and (C) a hydrohalide of one of the group consisting of ammonia, alkyl substituted ammonia and hydroxyl substituted ammonia in the molal ratio of A:B:C=1:0.8–4:0.5–1. In the co-pending application Serial No. 772,213, filed September 4, 1947 in the names of John W. Schick and Howard D. Hartough, a method of preparing emulsions of nitrogenous phenolic type resins is described. This method comprises condensing a phenol, an aldehyde and a hydrohalide of ammonia or substituted ammonia in the molal proportion of phenol:aldehyde:hydrohalide of 1:1 to more than 1:0.5 to 5 in the presence of sulfur dioxide or an alkali metal bisulfite.

It now has been discovered that the novel nitrogenous phenolic resins described in the pertinent foregoing applications and the novel nitrogenous heterocyclic resins described in the pertinent foregoing applications can be used cooperatively in the treatment of fibrous textile materials to provide materials which are crush-resistant and water-proofed.

The method of crush-proofing and water-proofing fibrous textile materials comprises preparing a water-soluble or water-suspendible nitrogenous resin of the phenol-aldehyde type as described in the aforesaid copending applications, impregnating the textile material therewith, converting the water-soluble or water-dispersible resin to a water-insoluble form, heat-curing the resin, impregnating the textile associated with the phenolic resin with a water-soluble derivative of a nitrogenous heterocyclic resin, converting the water-soluble derivative of the nitrogenous heterocyclic resin to the water-insoluble form and heat-curing the water-insoluble nitrogenous heterocyclic resin.

A modification of the foregoing comprises impregnating textile material with a water-soluble or water-dispersible nitrogenous phenolic resin, impregnating the so-treated textile material with a water-soluble derivative of a nitrogenous heterocyclic resin, converting the water-soluble or water-dispersible forms of both resinous materials to water-insoluble forms and heat-curing the so-treated textile material.

Illustrative of the specific steps of a sequence which has provided satisfactory results is the following:

About 10 to 15 parts by weight of a nitrogenous phenolic resin obtained as described in the pertinent copending applications enumerated hereinbefore is warmed in about 100 parts by weight of water or a mixture of water and a co-solvent such as alcohol, acetone, etc. The amount of co-solvent is that required to carry the resin into suspension. The fibrous textile material to be treated is immersed in the said suspension, the excess solution squeezed out and the impregnated cloth immersed in an aqueous 12 weight per cent formaldehyde solution, again gently squeezed to remove excess formaldehyde solution and cured at about 115 to 120 degrees centigrade. The so-treated textile material is then immersed in a 3 to 25 weight per cent aqueous solution of a water-soluble derivative of a nitrogenous heterocyclic resin, excess solution removed and the water-soluble derivative converted to a water-insoluble derivative of the heterocyclic resin. The so-treated textile material is water-washed to remove loosely bound resinous material on the surface and immersed in an alkaline aqueous formaldehyde solution. A 5 to 25 weight per cent solution is preferred. Thereafter the textile material associated with both phenolic and heterocyclic nitrogenous resins is heat-cured at about 110 to about 125 degrees centigrade for a short time. The treated textile is then laundered and pressed to produce a crush-proofed and water-proofed textile.

Illustrative of the foreing are the following non-limiting examples:

Example I

A seven inch square of cotton poplin was impregnated in an aqueous 10 weight per cent dispersion of a nitrogenous resin prepared from one mole of phenol, 3 moles of formaldehyde, one mole of ammonium chloride and one mole of sodium bisulfite as described in the copending application. Excess resin dispersion was removed and the impregnated cloth immersed in an aqueous 12 weight per cent formaldehyde solution. Excess formaldehyde solution was removed and the impregnated poplin heat-cured at 115 to 120 degrees centigrade. The poplin associated with the heat-cured phenolic resin was immersed in an aqueous solution containing 6 weight per cent of active ingredient, the active ingredient being water-soluble derivative of a heterocyclic nitrogenous resin (the hydrochloride) prepared from one mole of thiophene, a large excess of formaldehyde, one mole of ammonium chloride and one mole of sodium bisulfite. The poplin associated with heat-cured phenolic resin and water-soluble derivative of the nitrogenous thiophene resin was immersed in an aqueous solution containing 10 weight per cent of sodium acetate. The poplin associated with heat-cured phenolic resin and a water-insoluble form of the nitrogenous thiophene resin was rinsed in cold water and immersed in an alkaline aqueous solution of formaldehyde containing 12 weight per cent of formaldehyde and one weight per cent of sodium hydroxide. Thereafter the so-treated poplin was again heat-cured at about 115 to 120 degrees centigrade. After two hand washings the treated poplin had a spray rating of 90+ and a crush-resistant finish.

Example II

About 2 moles of thiophene, about 4 moles of ammonium chloride, about 9 moles of formaldehyde as an aqueous solution thereof and about 0.8 mole of sodium bisulfite were heated at about 70 degrees centigrade for about 20 minutes. To the mixture was added a solution of about 0.5 mole of phenol in about 0.5 mole of thiophene. The resultant mixture was heated at reflux for about 2 hours. All of the material was then water-soluble. One part of the solution was diluted with 5 parts of water and cotton poplin impregnated therewith and heat-cured at about 115 degrees centigrade. The poplin associated with the cured resinous material was water-repellent and had a spray rating of about 70+ but was not crush-proof.

Example III

A mixture of about 0.5 mole of phenol, about 0.5 mole of thiophene, about one mole of ammonium chloride, about one mole of sodium bisulfite and about 3 moles of formaldehyde as a 36 weight per cent aqueous solution were heated about 4.5 hours. The temperature rose from 73 to about 100 degrees centigrade. When the reaction cooled to ambient temperature it separated into an upper orange colored layer and a lower yellow colored layer.

Ten grams of the upper resinous layer was suspended in 90 grams of water and filtered. A seven inch square of cotton poplin was impregnated with the solution, then immersed in aqueous 10 per cent sodium acetate, rinsed in cold water, immersed in a 12 per cent aqueous alkaline formaldehyde solution containing 1 per cent of sodium hydroxide and cured at 115 to 120 degrees centigrade. After three hand washings the so-treated poplin had a spray rating of 50 and some crease-resistant properties.

We claim:

1. A method of crush-proofing and water-proofing fibrous organic textile material which comprises immersing an organic textile material in an aqueous bath having dispersed therein about 10 to about 15 parts by weight of a nitrogenous phenolic resin per 100 parts by weight of aqueous medium, immersing said organic textile material in an aqueous 12 weight per cent formaldehyde solution, heating said organic textile material and said resin at about 115 to about 120° C., immersing the so-treated organic textile material in an aqueous about 3 to about 25 weight per cent solution of a nitrogenous heterocyclic resin, immersing the so-treated organic textile material in an alkaline aqueous solution containing about 5 to about 25 weight per cent formaldehyde, heating the so-treated organic textile material at about 110 to about 125° C. and washing the so-treated organic material; said nitrogenous phenolic resin having been prepared by reacting (A) a phenol, (B) formaldehyde and (C) a halide selected from the group consisting of hydrohalides of ammonia and substituted ammonia in the molal ratio of A:B:C=1:2–4:0.5–1; and said nitrogenous heterocyclic resin having been prepared by reacting (X) a compound having at least one nuclear hydrogen atom of pronounced reactivity selected from the group consisting of thiophenes, furans and pyrroles, (Y) formaldehyde and (Z) a halide selected from the group consisting of halide of ammonia and substituted ammonia in the molal ratio of 1 to 2:0.5 to 4:0.25 to 3.

2. A method of crush-proofing and water-proofing fibrous organic textile material which comprises immersing an organic textile material in an aqueous dispersion of a nitrogenous phenolic resin, immersing the so-treated organic textile material in an aqueous bath containing formaldehyde, heating the so-treated organic textile material at about 115° to 120° C., immersing the so-treated organic textile material in aqueous solution containing a water soluble heterocyclic resin, immersing the so-treated organic textile material in an aqueous solution of sodium acetate, immersing the so-treated organic textile material in an alkaline aqueous solution of formaldehyde, heating the so-treated organic textile material at about 115° to about 120° C., and washing the so-treated organic material; said nitrogenous phenolic resin having been prepared by reacting (A) phenol, (B) formaldehyde, (C) ammonium chloride and (D) sodium bisulfite in the molal ratio of A:B:C:D=1:3:1:1 and said heterocyclic resin having been prepared by reacting (W) a thiophene having at least one nuclear hydrogen atom of pronounced reactivity, (X) formaldehyde, (Y) ammonium chloride and (Z) sodium bisulfite in the molal ratio of W:X:Y:Z=1: a large excess of 1 mole:1:1.

3. A method of crush-proofing and water-proofing fibrous organic textile material which comprises contacting organic textile material with an aqueous bath containing a nitrogenous phenolic resin, contacting the so-treated organic textile material with formaldehyde to convert said resin to water-insoluble form, heating the so-treated organic textile material at elevated temperatures not greater than about 120° C., contacting the so-treated organic textile material with an aqueous bath containing a water-soluble form of a nitrogenous heterocyclic resin, contacting the so-treated organic material with aqueous solution of sodium acetate to convert said water-soluble form of said resin to a water-insoluble form, heating the so-treated organic textile material at elevated temperatures not greater than about 125° C., and washing the so-treated organic textile material; said nitrogenous phenol resin having been prepared by reacting (A) a phenol, (B) formaldehyde and (C) a halide selected from the group consisting of hydrohalides of ammonia and substituted ammonia in the molal ratio of A:B:C= 1:2–4:0.5–1 and said nitrogenous heterocyclic resin having been prepared by reacting (X) a compound having at least one nuclear hydrogen atom of pronounced reactivity selected from the group consisting of thiophenes, furans and pyrroles, (Y) formaldehyde and (Z) a halide selected from the group consisting of halides of ammonia and of substituted ammonia in the molal ratio of X:Y:Z=1:0.8 to 4:0.5 to 1.

4. A method of crush-proofing and water-proofing fibrous organic textile material which comprises contacting fibrous organic textile material with an aqueous bath containing a nitrogenous phenolic resin, contacting the so-treated textile material with an aqueous bath containing a nitrogenous heterocyclic resin, contacting said textile material, phenolic resin and heterocyclic resin with aqueous sodium acetate to convert said resins to water-insoluble form, heating said textile material and said resins at elevated temperatures not greater than about 125° C., and washing the so-treated organic textile material; said nitrogenous phenolic resin having been prepared by reacting (A) a phenol, (B) formaldehyde and (C) a halide selected from the group consisting of hydrohalides of ammonia and substituted ammonia in the molal ratio of A:B:C=1:2–4:0.5–1, and said nitrogenous heterocyclic resin having been prepared by reacting (X) a compound selected from the group consisting of thiophene, furan and pyrrole, (Y) formaldehyde and (Z) a halide selected from the group consisting of hydrohalide of ammonia and substituted ammonia, X and Z being in the molal ratio of 1:1 and Y being present in excess of one mole per mole of X.

5. Fibrous organic textile material having distributed thereon a nitrogenous phenolic resin prepared by reacting (A) a phenol, (B) formaldehyde and (C) a halide selected from the group consisting of the halides of ammonia and substituted ammonia in the molal ratio of A:B:C=1:2–4:0.5–1 and a nitrogenous heterocyclic resin prepared by reacting (X) a heterocyclic compound selected from the group consisting of thiophene, furan, pyrrole, (Y) formaldehyde and (Z) a halide selected from the group consisting of halides of ammonia and substituted ammonia, X and Z being in the molal ratio of 1:1 and Y being present in excess of one mole per mole of X.

6. Fibrous organic textile material having distributed thereon a nitrogenous phenolic resin prepared by reacting (A) phenol, (B) formaldehyde, (C) ammonium chloride and (D) sodium bisulfite in the molal ratio of

A:B:C:D=1:3:1:1 and a nitrogenous heterocyclic resin prepared by reacting (W) thiophene, (X) formaldehyde, (Y) ammonium chloride and (Z) sodium bisulfite in the molal ratio of 1: a large excess of formaldehyde:1:1.

7. Fibrous organic textile material having distributed thereon successively a nitrogenous phenolic resin prepared by reacting a phenol, formaldehyde and ammonium chloride and a nitrogenous heterocyclic resin prepared by reacting a thiophene having at least one nuclear hydrogen atom of pronounced reactivity, formaldehyde and ammonium halide said phenol, formaldehyde and said ammonium chloride having been reacted in the molal ratio of 1:2 to 4:0.5–1 and said thiophene, formaldehyde and ammonium halide having been reacted in the molal ratio of 1 to 2:0.5 to 4:0.25 to 3.

JOHN W. SCHICK.
HOWARD D. HARTOUGH.

REFERENCES CITED

The following references are of record in the file of this patent:

UNITED STATES PATENTS

| Number | Name | Date |
|---|---|---|
| 2,114,121 | Bender | Apr. 12, 1938 |